United States Patent [19]

Debruhl, Jr.

[11] Patent Number: 4,842,204
[45] Date of Patent: Jun. 27, 1989

[54] TRAVELING IRRIGATION SYSTEM

[76] Inventor: Ray Debruhl, Jr., 308 Forest Dr., La Grange, N.C. 28551

[21] Appl. No.: 79,472

[22] Filed: Jul. 30, 1987

[51] Int. Cl.⁴ .............................................. A01G 25/09
[52] U.S. Cl. .................................... 239/744; 239/726; 239/735; 239/751; 104/91; 47/17
[58] Field of Search ............... 239/723, 726, 735, 750, 239/751, 752, 753, 739, 743, 744; 104/288, 89, 90, 106, 91, 242, 245, 247; 47/65, DIG. 6, 17

[56] References Cited

U.S. PATENT DOCUMENTS

| | | | |
|---|---|---|---|
| 762,014 | 6/1904 | Wittbold | 239/209 |
| 910,400 | 1/1909 | Lischer | 239/208 |
| 3,295,763 | 1/1967 | Brauner | 239/751 |
| 3,985,161 | 10/1976 | Nelson | 239/751 |
| 4,074,856 | 2/1978 | Williams et al. | 239/739 |
| 4,723,714 | 2/1988 | Lucas | 239/751 |

FOREIGN PATENT DOCUMENTS

| | | | |
|---|---|---|---|
| 0080001 | 1/1983 | European Pat. Off. | 239/752 |
| 1352246 | 5/1974 | United Kingdom | 104/245 |
| 2181031 | 4/1987 | United Kingdom | 239/751 |

Primary Examiner—Andres Kashnikow
Assistant Examiner—Christopher G. Trainor
Attorney, Agent, or Firm—Rhodes, Coats & Bennett

[57] ABSTRACT

This invention is an irrigation system which is mounted on parallel tracks and spans the distance therebetween. The main frame is of the truss type and includes a drive means on each end thereof. Also, a tensioning means is provided to assure perpendicular travel of the irrigation system relative to the support track to prevent any twisting tendency. The system can be operated either automatically or manually, and when on automatic, it will cycle back and forth over the designated area.

10 Claims, 6 Drawing Sheets

TRAVELING IRRIGATION SYSTEM

FIELD OF THE INVENTION

This relates to irrigating means and more particularly to power driven, traveling irrigation systems.

BACKGROUND OF THE INVENTION

Since humanity first began tending plants, there has been a problem of administering water and other nutrients to assure normal growth of such plants. Various means have been devised from simply flooding ditches in fields to elaborate underground tube systems and above ground sprinkler systems.

More recently, the raising of plants in greenhouses has become increasingly popular since a much more controlled environment is provided. Relative to irrigating the plants in the greenhouses, various spray systems have been devised to eliminate hand watering, the most recent innovations dealing with rails mounted in the peak of the greenhouse and depending therefrom with outwardly extending manifolds carrying spray nozzles. These systems have at least two drawbacks. First, they are by nature flimsy when spanning anywhere near the width of a normal greenhouse and require guy wires and similar support means. Also, the amount of space taken up by the depending apparatus as well as the supporting guy wires and outwardly extending manifolds for all practical purposes eliminates the use of over head supported growing containers such as hanging pots and the like. This, reduces the usable interior greenhouse space by as much as one third to one half.

SUMMARY AND OBJECTS OF THE INVENTION

After much research and study into the above-mentioned problems, the present invention has been developed to provide a means for irrigating large expanses of open area while utilizing a minimum of space. This is accomplished by providing a pair of parallely disposed tracks or rails at either side of the area to be irrigated and disposing a truss-like frame thereacross which is driven on both ends and includes selve adjusting means to assure perpendicular travel to prevent binding and other problems from developing during operation. This truss type frame carries one or more manifolds with a plurality of nozzles associated therewith. The system can water plants both above and below the same and can be operated either manually or automatically with both time of operation and volume of irrigating water dispersed being controlled. The irrigation system, the present invention, can be used either in enclosed areas such as greenhouses or can be used in conjunction with open fields.

In view of the above it is an object of the present invention to provide an irrigation system which spans relatively large, open areas.

Another object of the present invention is to provide an irrigation system for relatively large expanses which is supported on either end thereof.

Another object of the present invention is to provide an irrigation system spanning a relatively wide area and being supported on either end thereof by rail type members.

Another object of the present invention is to provide a space saving irrigation system including rails on each side of a relatively wide expanse with a truss-like frame carrying drive means, spray nozzle manifolds, and controls.

Other objects and advantages of the present invention will become apparent and obvious from a study of the following description and the accompanying drawings which are merely illustrative of such invention.

DETAILED DESCRIPTIN OF THE INVENTION

Figure 1:
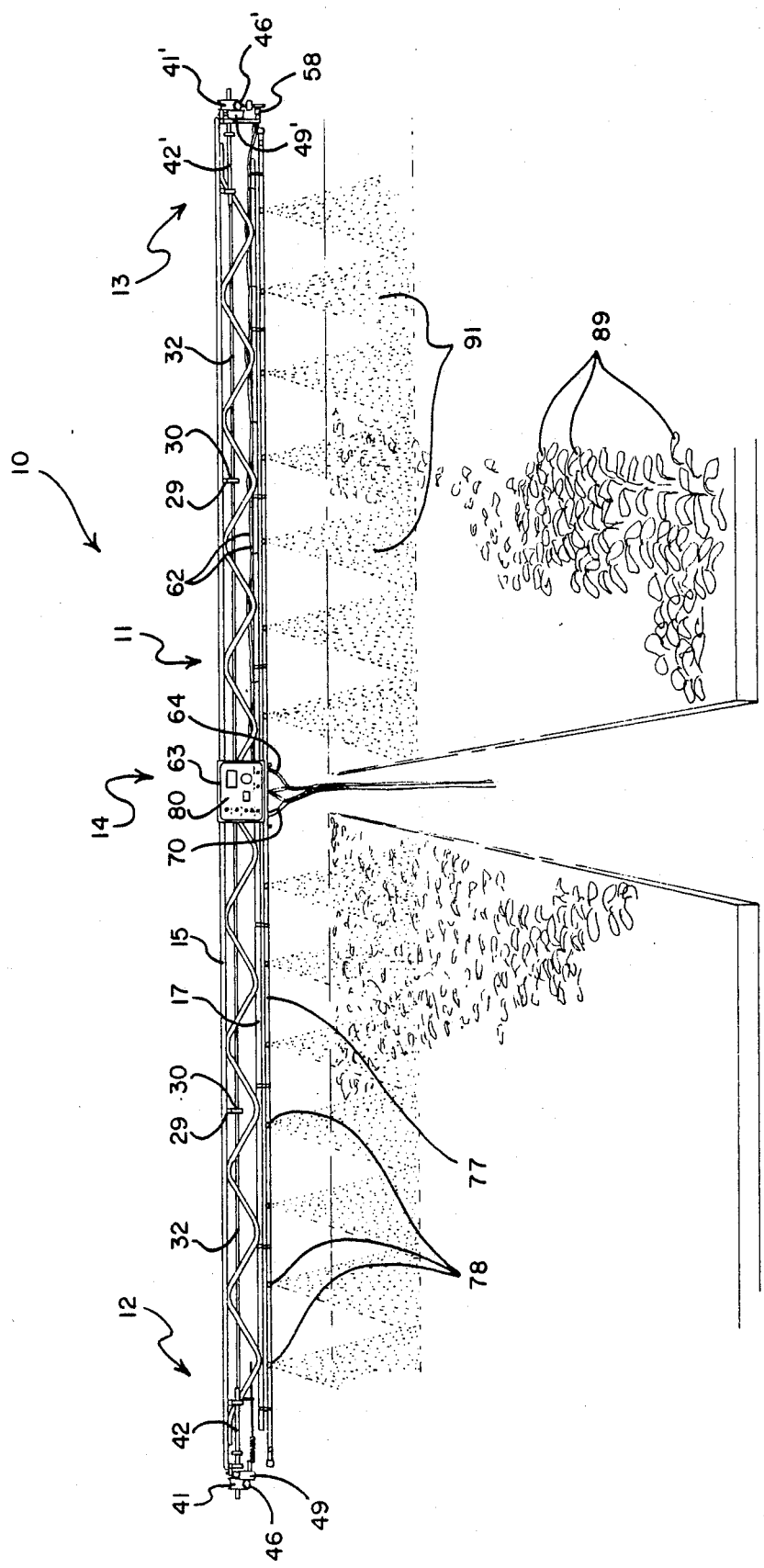
FIG. 1 is a front elevational view of the improved irrigation system of the present invention.
Figure 2:
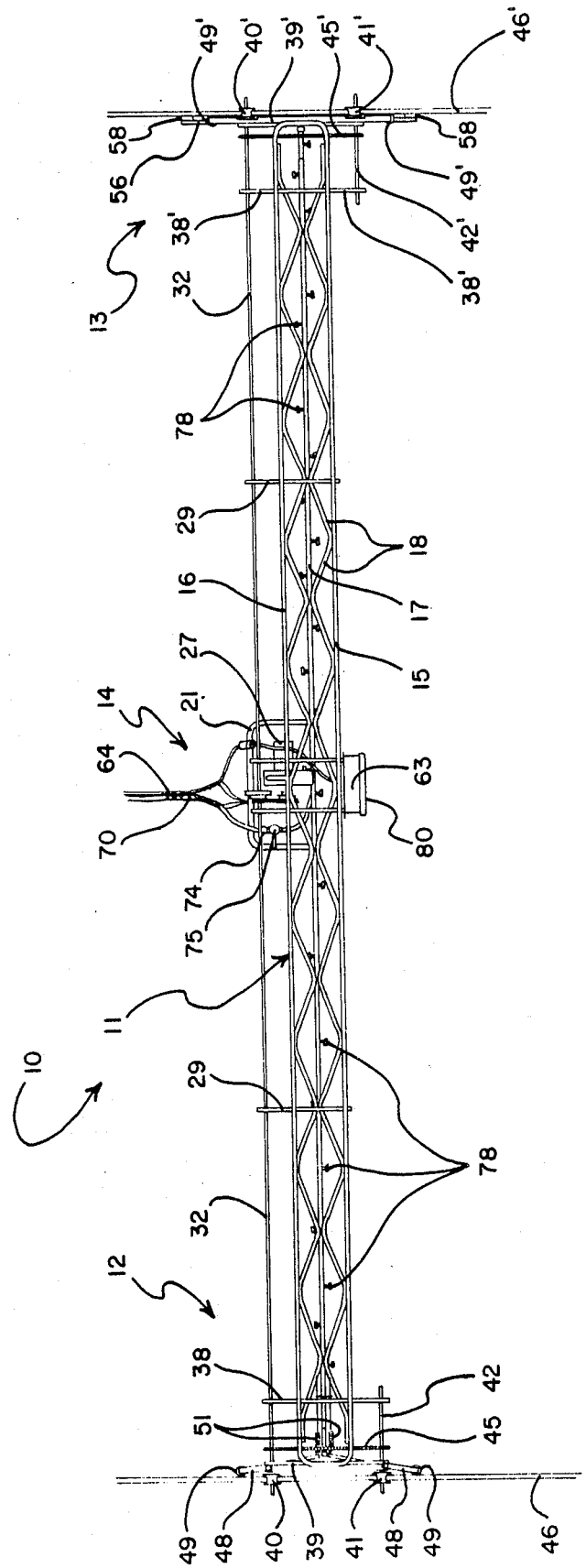
FIG. 2 is a top plan view thereof.

With further reference to the drawings, the improved irrigation system of the present invention, indicated generally at 10, includes a mainframe, indicated generally at 11, having a left end portion, indicated generally at 12, a right end portion, indicated generally at 13, and a central portion, indicated generally at 14.

The main frame 11 is preferably of the truss type and includes a pair of generally parallely disposed upper frame members 15 and 16, a generally parallel lower frame member 17, and cross frame members 18 which interconnect said upper and lower frame members as can clearly be seen in the figures. Said cross frame members are fixedly secured to said upper and lower frame members by weldment or other suitable means.

End frames 19 and 20 connect the upper frame members 15 and 16 at the left and right end portions 12 and 13, respectively.

A generally U-shaped accessory support frame 21 is secured by weldment or other suitable means to the central portion of lower frame member 17. A generally L-shaped motor tension frame 22 is secured by weldment or other suitable means to upper frame member 16. The lower end of this frame has a threaded rod 23 attached thereto. Interiorly threaded sleeve 24 is threaded onto a rod 23 so that said sleeve can be adjusted upwardly and downwardly. A motor support bracket 25 is pivotively attached to lower frame member 17 at hinge points 26. Since hinge type pivots are well known to those skilled in the art, further detail discussion of this portion of the present invention is not deemed necessary.

A drive motor 27 is secured to support bracket 25 by suitable means such as mounting bolts 28. A pair of rearwardly extending drive shaft support arms 29 are secured by weldment or other suitable means across upper frame member 15 and 16. Bearing blocks 30 are secured to the outer ends of support arms 29 by suitable means such as bolts 31.

Elongating main drive shaft 32 is rotatively mounted through bearing blocks 30. In the central portion of drive shaft 32 is fixedly mounted a cone pulley 33. This cone pulley is aligned with an oppositely disposed cone pulley 34 fixedly mounted on the drive shaft 35 of motor 27. Thus, it can be seen that drive belt 36 can be moved up or down the cone pulleys 33 and 34 to increase or decrease the drive speed ratio between the motor drive shaft 34 and the main drive shaft 32.

Once proper location of the drive belt 36 on cone pulleys 33 and 34 has been determined, tension sleeve 24 can be manipulated up or down on threaded rod 23 so that, through pivotively mounted motor support bracket 25, proper tension on said drive belt can be established and maintained.

For convenience in assembly, one or more drive shaft couplers 37 can be provided. Since couplers of this type are well known to those skilled in the art, further detail discussion of the same is not necessary.

Main drive shaft 32 extends the length of main frame 11 and is periodically supported by support arms 29 and their associated bearing blocks 30. Adjacent the left end portion 12 is a double drive shaft support arm 38 that mounts a bearing block 30 on each end thereof. Also, an end double drive shaft support arm 39 is mounted on end frame 19 and supports bearing blocks 30 on each end thereof.

Fixedly mounted on the end of drive shaft 32, outside arm 39, is a concave wheel 40 for supporting and driving the irrigation system 10 of the present invention.

Figure 3:
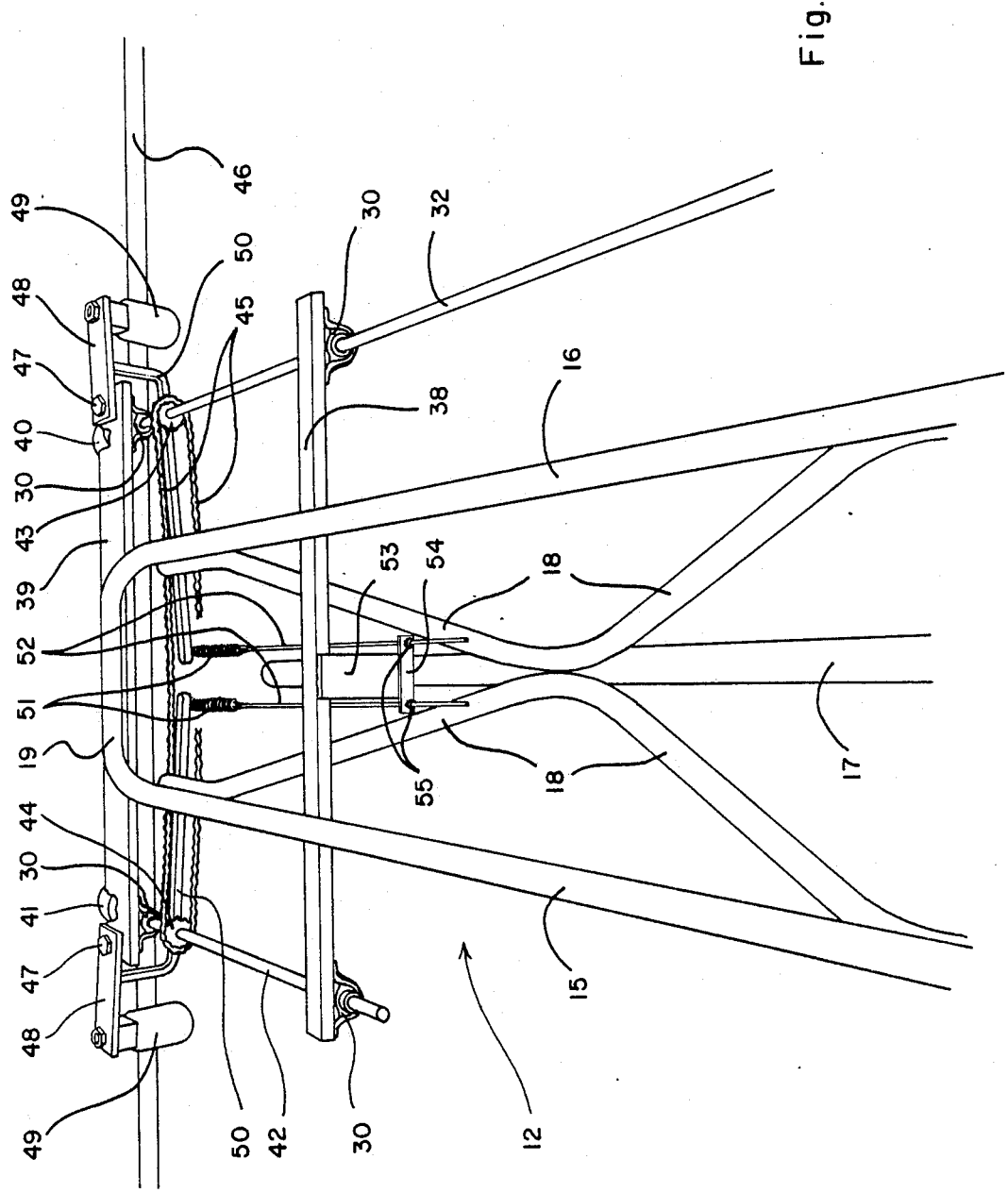
FIG. 3 is a perspective view of the left end portion thereof.

A second drive wheel 41, similar to wheel 40, is disposed outside of arm 39 and is fixedly mounted on secondary drive shaft 42 as can clearly be seen in FIG. 3. Drive sprockets 43 and 44 are fixedly mounted on drive shafts 32 and 42, respectively, and are interconnected by drive chain 45 which is trained thereabout. Thus it can be seen that, through sprockets 43 and 44 and their interconnecting drive chain 45, shafts 32 and 42 will rotate at the same speed to drive wheels 40 and 41 at the same speed along support rail 46.

Pivot bolts 47 are provided on opposite ends of arm 39 and swingingly mount tension brackets 48. The outer ends of these brackets rotatively mount downwardly extending tension rollers 49 which engage support rails 46 on the inside thereof.

Intermediate the ends of each of the tension brackets 48 is fixedly secured an L-shaped tension arm 50 projecting inwardly toward each other. The ends of these arms opposite their respective bracket 48 are secured to a tension spring 51. The opposite end of each of these springs is connected to a threaded tension rod 52.

A bracket 53 is secured to arm 38 and includes a cross member 54. Each of the threaded rods 52 are adapted to pass through openings in the ends of cross member 54 and the tension on each spring 51 is set by adjusting the nuts 55 threaded onto each of the rods 52. Thus, it can be seen that as rods 52 are shortened, more pressure is applied to each of the springs 51 which, through the respective arms 50 and bracket 48, apply pressure to the respective rollers 49 thus tensioning the entire frame against track 46 in the direction of right end portion 13.

Figure 4:
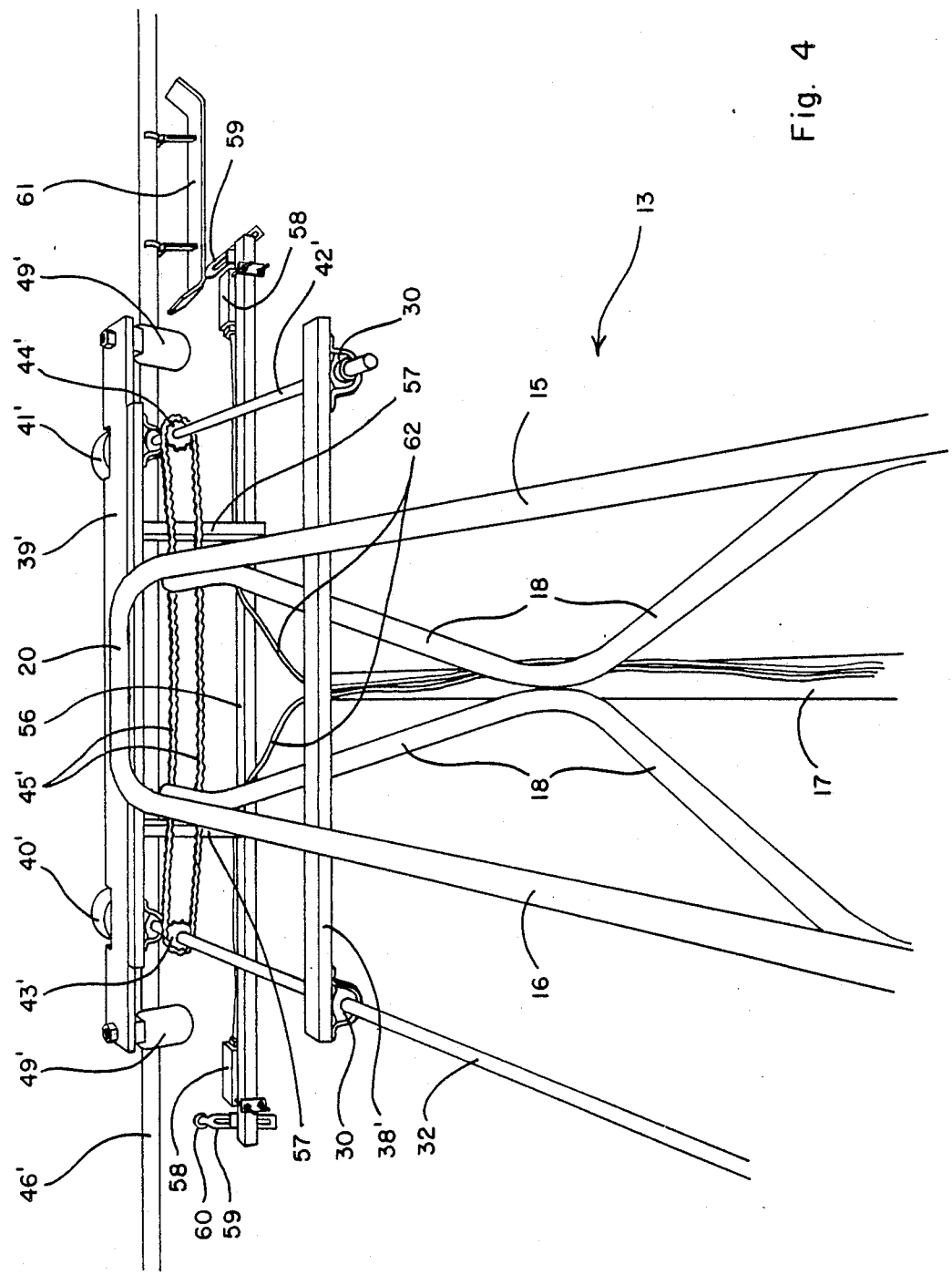
FIG. 4 is a perspective view of the right end portion thereof.
Figure 5:
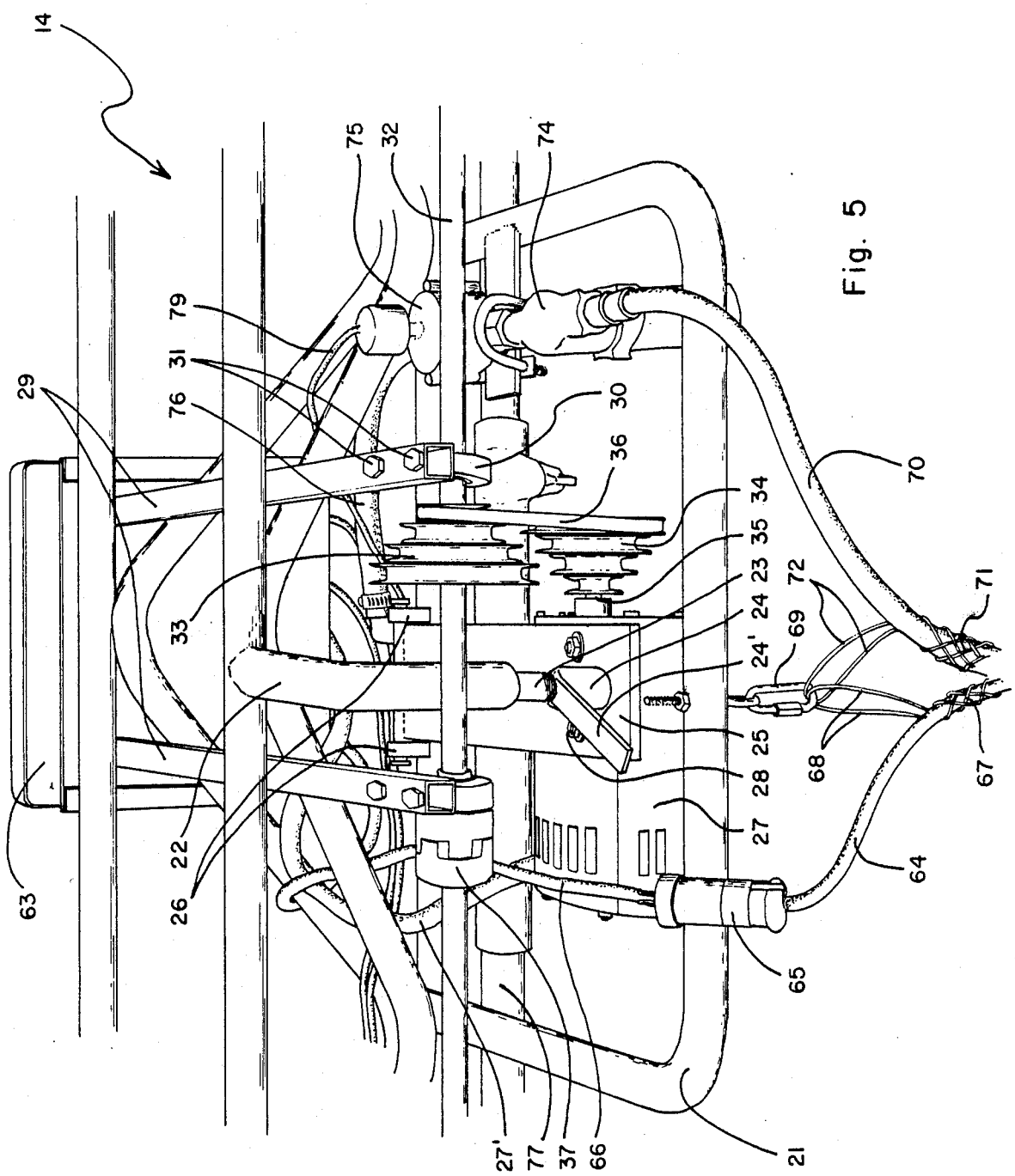
FIG. 5 is a perspective view of the central drive and control portion thereof.
Figure 6:
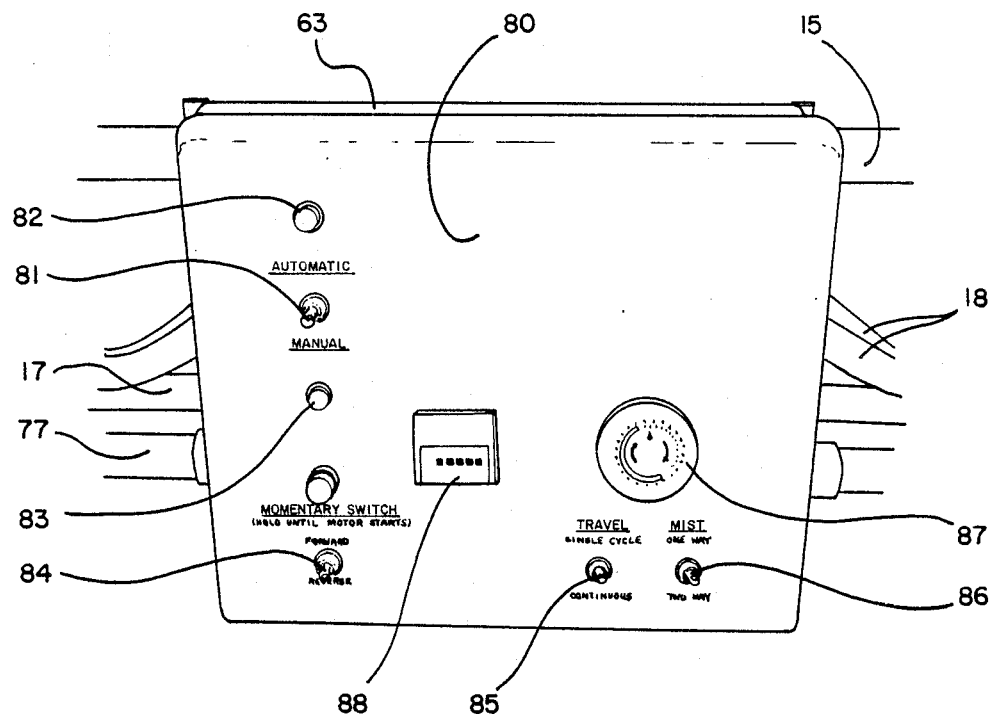
FIG. 6 is a front elevational view of the central panel of the present invention.

Referring more specifically to the right end portion 13 shown in detail in FIG. 4, a drive shaft 32 is supported by double drive shaft arm 38' and end double drive shaft arm 39' with their associated bearing blocks 30. Likewise, secondary drive shaft 42' is supported by said arms and their associated bearings. The ends of drive shafts 32 and 42' both mount wheels 40' which are supported by a rail 46'.

It should be noted that the end arm 39' extends outwardly beyond the two drive shafts and rotatively mounts vertically disposed guide rollers 49' which differs from tension rollers 49 only in that there is no tensioning means provided on this end 13 of the present invention.

Drive sprockets 43' and 44' are fixedly secured to shafts 32 and 42' respectively and have trained thereabout drive chain 45'.

A control arm 56 is mounted below end arm 39' and secured thereto by brackets 57. On each end of control arm 56 is mounted a switch control 58 which is operatively secured to generally vertically disposed switch finger 59. A contact roller 60 is provided on one end of each of the fingers 59 and is adapted to engage cam plate 61 which is mounted on rail 46'. One of these cam plates 61 is provided at each end of railing 46' to control the limits of travel of the present invention as will here and after be described in greater detail.

Each of the switch controls 58 are connected through electrical line 62 to control panel 63 mounted in the central portion 14 of the present invention.

When the roller 60 of the switch finger 59 on either end of control arm 56 engages one of the cam plates 61, it will ride down the slanted portion thereof to activate its respective switch control 58 for the purposes that here and after be set forth.

A power cord 64 is operatively connected at one end to a power source (not shown) and at the other end two power cord connector 65. This connector through line 66 to control panels 63.

A mesh sleeve 67 gripingly engages power cord 64 and is secured to accessory support 21 by cables 68 and linkage 69 to prevent undue stress from being placed on said power cord and its associated connector when the system of the present invention is in operation.

A flexible water line 70 also passes through a mesh sleeve as indicated at 71 and is connected to accessories 21 by means of cables 72 and linkage 69. Again this arrangement prevents undue stress from being placed on said line.

Water line 70 is operatively attached to pressure regulator 74 which in turn is operatively connected to solenoid activated control valve 75. This control valve, through line 76, is connected to manifold 77 which is mounted to and is disposed below lower frame member 17 and extends across the length of the irrigation system 10 of the present invention.

A plurality of spray nozzles 78 spacingly mounted along manifold 77 and are so oriented as to cover the entire area below the irrigation system of the present invention, and if so desired, to spray above said system to irrigate plants suspended in that area. Since nozzles of this type are well under the skill in the art, further detail discussion of the same is not deemed necessary.

Control valve 75 is operatively connected to control panel 63 by way of wiring 79.

On the face 80 of control panel 63 are a plurality of control switches including "automatic/manual" selection switch 81 and its associated "automatic" indicator light 82 and "manual" indicator light 83 which are preferably red and white, respectively; "forward/reverse" switch 84; "single cycle/continuous" switch 85; and a "one way/two way" mist control switch 86. Also a setable "water flow control" 87 and a setable "operating timer" 89 are provided. These various controls are operatively connected to drive motor 27, control valve 75, and control switches 58. Since controls of these types and the various motors, valves, and control switches they are connected to and their modes of operation are well known to those skilled in the art, further detail discussion of the same is not deemed necessary.

To use the irrigation system 10 of the present invention, rails 46 and 46' are mounted parallel to each other, preferably on opposite sides of the greenhouse or other area to be irrigated. Due to the strength of the truss type configuration of the main frame 11, it can be constructed to span relatively wide areas which will allow it to span almost any greenhouse structure. In other applications, of course, pluralities of parallel rails could be used with a plurality of irrigation systems.

Once the rails 46 and 46' are in place, the irrigation system 10 can be supported thereon by drive wheels 40 and 41, and 40' and 41'. The proper tension on springs 51 are set to tightly bias tension rollers 49 against the inside of track 46. This will bias the entire system 10 in the direction of rail 46'. The rollers 49', mounted on fixed arm 39', will thus be pressed against rail 46' and any tendency of the irrigation system 10 to cock at an angle other than perpendicular between the two support rails will be prevented. In other words, the spring biased, pivotively mounted tension rollers 49 will press the fixedly mounted rollers 49' against rail 46' so that the irrigation system will always run perpendicular to its support rails.

Next the power cord 46 and the water line 47 are operatively connected to respective power and water sources (not shown).

The "automatic/manual" switch must either be manipulated to choose either "automatic" or "manual" operation. If "manual" operation is chosen, then the "forward/reverse" switch must be operated to determine the direction of travel of the device. The "single cycles/continuous" switch must be manipulated to choose either "single cycle" operation or "continuous" operation. The type of mist must also be selected as well as the amount of water flow desired and the period of operation.

Once the above selections have been made, then power from the control panel will activate the solenoid of control valve 75 to allow water to flow through water line 70, pressure regulator 75, and line 76 into manifold 77 and out spray nozzles 78 onto the plants 79 being irrigated. At the same time drive motor 27 will receive power through power cord 27' which will drive cone pulley 34 which, through belt 36, will drive cone pulley 33 mounted on drive shaft 32. Since this drive shaft runs the entire length of the irrigation system, it will in turn drive pulleys 43 and 43' at end portions 12 and 13 respectively. Through these respective drive chains 45 and 45' and sprockets 44 and 44', drive wheels 40 and 41, and 40' and 41' will evenly move the irrigation system 10 of the present invention along parallely disposed rails 46 and 46'. As the end of these rails are approached, one of the rollers 60 of one of the control fingers 59 will engage cam plate 61 to activate control switch 58. This control switch will send a signal through line 62 back to the control panel and will either stop the irrigation system or will cause the same to automatically reverse, according to the setting of the controls on the panel.

From the above it can be seen that the present invention provides a relatively simple and yet highly efficient means for irrigating relatively large areas of growing plants and accurately disperse a desired amount of water during a preset time period. The present invention takes up very little space which allows not only plants to be located below the same, but also things can be hung above without interfering with the operation of such irrigation system. Although relatively simple in structure, the present invention is extremely sturdy and gives no hint of flimsiness. The present invention also allows for accurate control of the irrigation process thus being highly efficient and allowing for maximum benefits to be received therefrom.

The present invention can, of course, be carried out in other specific ways than those herein set forth without departing from the spirit and essential characteristics of the invention. The present embodiments are, therefore, to be considered in all respects as illustrative and not restrictive, and all changes coming within the meaning and equivalency range of the appended claims are intended to be embraced therein.

What is claimed is:

1. An end supported boom type traveling irrigation system for moving through a greenhouse and watering plants therein, comprising:
   (a) a pair of generally parallel rails extending along opposite sides of the greenhouse;
   (b) a transverse boom assembly extending between and supported by the rails and adapted to move back and forth thereon;
   (c) the boom assembly including a pair of longitudinally spaced drive rollers mounted to opposite ends of the boom assembly and supported by the guide rails;
   (d) a power source mounted intermediately on the boom assembly;
   (e) a drive train operatively interconnected between the power source and the drive rollers for driving both rollers at each end of the boom assembly;
   (f) guide roller means associated with the boom assembly and engaged with the rails for maintaining the boom assembly generally perpendicular to the rails and in alignment therewith an the boom assembly moves along the rails;
   (g) the guide roller means including a first pair of longitudinally spaced rollers fixed with respect to a first side of the boom assembly and mounted for engagement with the inner side of one of the rails, and a second pair of guide rollers movably mounted to a second side of the boom assembly;
   (h) biasing means associated with the second pair of movable guide rollers for biasing the same outwardly for engagement with the inner side of the rail adjacent the second side of the boom assembly such that as the boom assembly moves down the rails, the guide rollers on both ends of the boom assembly engage the inner side of the rails and maintain the drive rollers in general alignment with the rails; and
   (i) a water system attached to the boom assembly and including a sprinkling line secured to the boom assembly for dispensing water onto the underlying plants located in the greenhouse.

2. The end supported boom type traveling irrigation system of claim 1 wherein the drive train comprises a main drive shaft operatively connected to the power system and extending outwardly toward each end of the boom assembly wherein the same is drivably connected to one of the pair of drive rollers mounted on each end of the boom assembly; secondary drive shaft means connected to the other of the pair of drive rollers mounted on each end of the boom assembly; and intermediate drive means connected between the main and the secondary drive shafts for transferring torque from the main drive shaft to the secondary drive shafts.

3. The end supported boom type traveling irrigation system of claim 1 wherein a pair of pivot arms are pivotally mounted to the second side of the boom assembly with each pivot arm having one of the second pair of guide rollers mounted thereon; and wherein the biasing means includes a tension arm secured to each pivot arm and extending therefrom, and spring means attached to the tension arms for biasing the same and urging the pivot arms outwardly where the guide rollers carried thereby are pressed against the inner side of the adjacent guide rail.

4. The end supported boom type traveling irrigation system of claim 1 wherein the boom assembly comprises a pair of parallel and horizontally aligned structural members interconnected and secured to a vertically spaced transverse member that lies intermediately between the pair of horizontally aligned members, and a connecting network interconnected between the pair of horizontally aligned members and the vertically spaced members.

5. An end supported and self-propelled boom type greenhouse irrigation system comprising:
 (a) a pair of parallel rails extending along opposite sides of a greenhouse;
 (b) a transverse boom structure extending between the rails;
 (c) drive wheels rotatively mounted to opposite ends of the transverse boom structure and supported on the parallel rails;
 (d) a power source mounted on the transverse boom structure between the opposite ends wherein the power source is carried by the transverse boom structure;
 (e) drive means extending outwardly from opposite sides of the power source and connected to the drive wheels on the opposite ends of the transverse boom structure for driving the same, thereby forming a self-propelled transverse boom structure;
 (f) longitudinally spaced guide roller means mounted on the opposite ends of the boom structure adjacent the drive wheels for engaging the inner side of each of the respective rails and maintaining the boom structure and drive wheels in alignment with the rails as the boom structure and drive wheels track back and forth on the rails; and
 (g) watering means carried on the transverse boom structure for directing water onto adjacent plants as the self-propelled transverse boom structure moves along the rails.

6. The boom type irrigation system of claim 5 wherein at least one of the guide rollers is movable back and forth with respect to the transverse boom structure and is provided with biasing means for biasing the guide roller outwardly for engagement with the adjacent rail.

7. The boom type irrigation system of claim 6 wherein the drive wheels include a pair of longitudinally spaced apart drive wheels disposed about each end of the transverse boom structure.

8. A method of watering plants within a greenhouse comprising:
 (a) erecting a pair of laterally spaced rails within the greenhouse;
 (b) extending an elongated boom structure between the rails;
 (c) rotatively mounting a pair of drive wheels to opposite ends of the transverse boom structure;
 (d) supporting the transverse boom structure on the rails by aligning the drive wheels with the rails and resting the same on the rails;
 (e) mounting a power source directly to the transverse boom structure intermediately between the opposed ends;
 (f) interconnecting the drive wheels with the power source;
 (g) securing a pair of longitudinally spaced guide rollers to each end of the boom structure;
 (h) engaging the inner side of the rails with the pair of guide rollers on each side of the boom structure so as to maintain the boom structure and the drive wheels in alignment with the rails as the boom structure and drive wheels track back and forth;
 (i) driving the transverse boom structure back and forth on the rails; and
 (j) watering plants within the greenhouse by directing water from the transverse boom structure as it moves back and forth on the rails.

9. The method of claim 8 wherein the step of guiding the transverse boom structure includes engaging the inner sides of the opposed rails and at least slightly shifting the transverse boom structure laterally back and forth in response to slight variations in the distance between the rails.

10. The method of claim 9 including; mounting at least one of the roller for movement with respect to transverse boom structure and biasing the roller for constant engagement with the inner side of the rails as the transverse boom structure traverses the greenhouse.

* * * * *